UNITED STATES PATENT OFFICE.

FRITZ BLAU, OF BERLIN, GERMANY, ASSIGNOR, BY MESNE ASSIGNMENTS, TO GENERAL ELECTRIC COMPANY, A CORPORATION OF NEW YORK.

PROCESS OF REMOVING CARBON FROM PRESSED BODIES OF TUNGSTEN.

1,135,154.   Specification of Letters Patent.   Patented Apr. 13, 1915.

No Drawing.   Application filed August 3, 1906.   Serial No. 329,026.

*To all whom it may concern:*

Be it known that I, Dr. FRITZ BLAU, chemist, a subject of the Emperor of Austria-Hungary, and a resident of S. W. 13, Alte Jakobstrasse 139, Berlin, Germany, have invented certain new and useful Improvements in Processes of Removing Carbon from Pressed Bodies of Tungsten; and I do hereby declare the following to be a full, clear, and exact description of the invention, such as will enable others skilled in the art to which it appertains to make and use the same.

My invention relates to an improved method of producing incandescent bodies for electric incandescent lamps.

I have heretofore employed a method for producing incandescent bodies for electric incandescent lamps from common heat-resisting metals, such as molybdenum, tungsten, vanadium, tantalum, consisting in first producing crude incandescent bodies containing carbon—such as one pressed from a powdered metal with the addition of an organic binding material—and then heating the same in an atmosphere that simultaneously reduces or preserves the metals and oxidizes the carbon, until the metals have been freed from carbon or contain only such a minute residue of carbon as not to injure the quality of the incandescent body.

The object of the present invention is, while retaining the reducing gases, to replace the oxidizing gases by such gases as remove the carbon, though not in the form of a compound of carbon and oxygen, that is by oxidization, but in another form. As described these reducing gases are adapted to surround and envelop the filament during the heating stage and they are supplied in quantities sufficient to accomplish the desired object of freeing the metal from carbon or until the filament contains only such a minute residue of carbon as not to injure the quality of the filament. In order to accomplish this result, it is apparent that the amount of reducing gases employed for each filament must be in excess of the quantity theoretically required to remove the total carbon contents of the crude filament.

In carrying the invention into effect, the removal of the carbon is effected by the use of gases containing no oxygen, and especially in the presence of nitrogen, which is used admixed in large proportion with the reducing hydrogen, or better still in the form of gaseous ammonia. An essential point with reference to the use of these gases (hydrogen, etc.) is that they shall not have any appreciable oxygen constituents so that the oxidation of the carbon of the crude filament is positively avoided and so that this carbon will be removed by a reaction or series of reactions in which oxygen plays no part. In using such a mixture with hydrogen, or ammonia, the carbon is also eliminated, apparently in the form of cyanogen and hydrocyanic acid. This method presents the advantage over the method described in my former application in that it can be much more easily carried out, so that even where there is some amount of carelessness, there is no danger of the resulting metal filament being attacked by any excess of added oxidizing gas. This is apparently due to the fact that the electric discharges which occur upon passing the current through the incandescent body when operating in the diluted gases, facilitate the elimination of the carbon.

The improved method is especially applicable for eliminating carbon from tungsten and molybdenum filaments containing carbon.

Having thus described my invention, what I claim as new and desire to secure by Letters Patent of the United States of America, is:

1. The process of removing carbon constituents from pressed bodies of tungsten containing carbon which consists in heating said body in an atmosphere composed essentially of nitrogen and hydrogen and in removing the carbon from said body in an unoxidized gaseous form by the agency of the nitrogen contained in said atmosphere.

2. The process of removing carbon constituents from pressed bodies of tungsten containing carbon which consists in heating said body in an atmosphere composed essentially of hydrogen gas and a relatively large quantity of nitrogen and in removing the carbon from said body in an unoxidized gaseous form by the agency of the nitrogen contained in said atmosphere.

3. The process of removing carbon constituents from pressed bodies of tungsten containing carbon which consists in heating said body in an atmosphere composed essentially of hydrogen gas and gaseous ammonia and in removing the carbon from said body in an unoxidized gaseous form by the agency of the nitrogen contained in said atmosphere.

In testimony, that I claim the foregoing as my invention, I have signed my name in presence of two subscribing witnesses.

DR. FRITZ BLAU.

Witnesses:
HENRY HASPER,
WOLDEMAR HAUPT.